F. C. SUTLIFFE.
CASTER.
APPLICATION FILED DEC. 9, 1920.
1,368,465.
Patented Feb. 15, 1921.
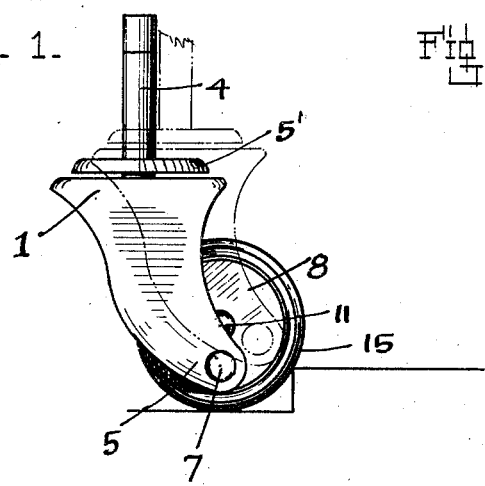
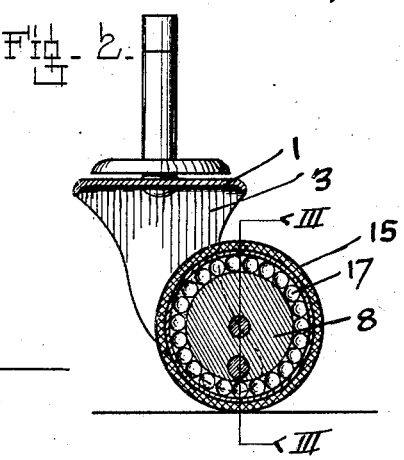
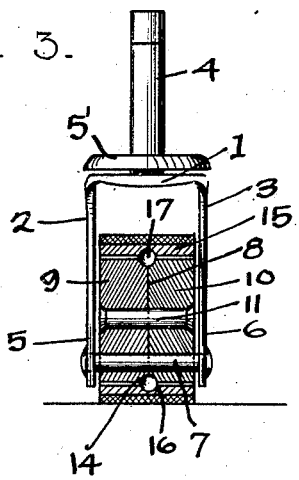
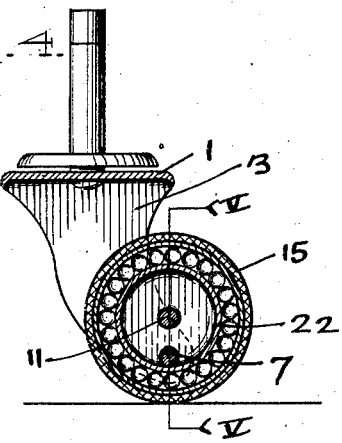
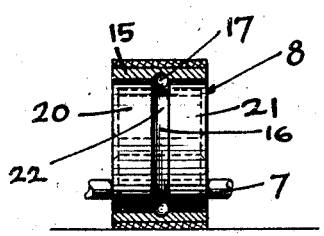
Inventor
FRANK C. SUTLIFFE
By Lincoln Johnson
Attorney

UNITED STATES PATENT OFFICE.

FRANK C. SUTLIFFE, OF SAN FRANCISCO, CALIFORNIA.

CASTER.

1,368,465.

Specification of Letters Patent.  Patented Feb. 15, 1921.

Application filed December 9, 1920. Serial No. 429,393.

*To all whom it may concern:*

Be it known that I, FRANK C. SUTLIFFE, a citizen of the United States, and a resident of the city and county of San Francisco, State of California, have made a new and useful invention—to wit, Improvements in Casters; and I do hereby declare the following to be a full, clear, concise, and exact description of the same.

This invention relates particularly to an improvement in roller casters.

The particular object of this invention relates to a new and novel construction of casters whereby friction is reduced materially and an easy rolling caster provided. Another object of the invention is to provide an improved construction obtaining all of the usual results of standard caster construction but at the same time providing a caster that will automatically permit a vertical height adjustment between the wheel and supporting frame. Other objects and advantages will appear as the description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one-sheet of drawings,

Figure 1 represents a side elevation of a caster constructed with my invention.

Fig. 2 represents a sectional side elevation through Fig. 1.

Fig. 3 represents an end elevation of the caster wheel taken through Fig. 2 on the line III—III.

Fig. 4 is a side elevation of a modified form of caster.

Fig. 5 is a sectional view through Fig. 4 on the line V—V.

In detail the construction illustrated in the drawings comprises the frame 1 having parallel depending side extensions 2 and 3 respectively to form the usual forked bracket. The upper surface 1 of the frame is provided with a projecting pintle 4 for the purpose of engaging a socket on any device to which a caster is attached. A ring-shaped annulus 5' or anti-friction member is placed around the socket engaging member adjacent the frame 1 and interposed between the frame 1 and the article to which the caster is applied, so as to permit a swiveling or free rotary action of caster and frame relative thereto. The arms 5 and 6 of the frame 1 are drilled transversely providing an alined opening through which a shaft 7 is placed and the ends thereof peened over on the sides of the frame members 2 and 3 to securely lock the said shaft in position.

An inner wheel generally designated by the numeral 8 comprises a pair of separable shaft engaging members 9 and 10 substantially circular in contour and joined together by the pin 11, that passes concentrically therethrough. An alined opening is bored through the said separable members, eccentrically, relative to the center pin 11 and the transverse shaft 7 is adapted to be passed therethrough. The separable members 9 and 10 are provided with a peripheral slot 14 therearound and a wheel or rim annulus 15 of substantially the same width as the separable members 9 and 10 is mounted thereon and provided with an internal groove 16 substantially intermediate the sides thereof and in alinement with the circumferential slot provided about the separable members. Suitable anti-friction ball races 17 or other appropriate ball or roller bearings are interposed between the wheel annulus 15 and the separable members 9 and 10 and retained in the alined slots 14 and 16 respectively. Thus the rolling effect of the outer wheel annulus 15 is transmitted through the anti-friction bearings to the separable members 9 and 10, the said outer rim and ball bearings revolving about the inner wheel member 8 as an axle. In Fig. 5 the modification of the inner wheel 8 consists of a pair of cap members 20 and 21 formed of a circular plate with the edge thereof turned over to form a peripheral rim and having an annular bushing 22 placed within the faced opened ends of the said members 20 and 21 so that a space remains between the respective members forming a groove or runway corresponding with the groove 16. The outer annulus 15 is placed around this modified form of wheel member in the usual manner and is provided with an internal slot around the inner periphery thereof so that anti-friction members may be interposed between said outer annulus and inner wheel member and retained in companion grooves formed therein.

An object of my construction permits the overcoming of the inherent faulty construction embodied in any of the usual types of caster wheels. The wheel of an ordinary caster that strikes an obstruction is stopped from rotating and assumes a skidding effect if the forward movement continues. The outer rim annulus of my device operates in the same manner as the usual caster wheel, the outer annulus revolving around the inner wheel 8 corresponding with a shaft. Where an obstruction is encountered by the outer annulus of my caster, the same is stopped from rotating but the forward propulsive movement forces the eccentric inner wheel around the inner circumference of the outer annulus to a point higher than the obstruction, exerting a forward leverage on the outer wheel and oscillating it over the said obstruction. Casters thus constructed operate more efficiently over traction surfaces of irregular formation.

Having thus described this invention, what I claim and desire to secure by Letters Patent is:

1. A caster comprising a frame having a projection thereon; a shaft provided on said frame; a wheel eccentrically and revolubly mounted on said shaft and a rim annulus rotatably mounted around said wheel.

2. A caster comprising a frame of substantially parallel side walls and having a socket engaging projection thereon; a shaft provided on said frame between said walls; a wheel eccentrically and revolubly mounted on said shaft; and a rim annulus rotatably mounted around said wheel.

3. A caster comprising a frame of substantially parallel side walls and having a socket engaging projection thereon; a shaft provided on said frame between said walls; a wheel eccentrically and revolubly mounted on said shaft; a rim annulus rotatably mounted around said wheel; and anti-friction means interposed between said wheel and rim.

4. A caster comprising a frame of substantially parallel side walls and having a socket engaging projection thereon; a shaft provided on said frame between said walls; a pair of separable shaft engaging members eccentrically and revolubly mounted on said shaft and concentrically connected relative to each other and a wheel annulus rotatably mounted around said shaft engaging members.

5. A caster comprising a frame of substantially parallel side walls and having a socket engaging projection thereon; a shaft provided on said frame between said walls; a pair of separable shaft engaging members eccentrically and revolubly mounted on said shaft and concentrically connected relative to each other; a wheel annulus rotatably mounted around said shaft engaging members; and anti-friction means interposed between said shaft engaging members and wheel annulus.

In testimony whereof I have hereunto set my hand at San Francisco, California, this 27th day of November, 1920.

FRANK C. SUTLIFFE.

In presence of—
LINCOLN V. JOHNSON.